United States Patent [19]

Kim et al.

[11] Patent Number: 5,533,138
[45] Date of Patent: Jul. 2, 1996

[54] IMAGE COMPRESSION ENCODING AND DECODING METHOD AND APPARATUS THEREFOR

[75] Inventors: Yong-Kyu Kim, Seoul, Rep. of Korea; Tianmin Liu, Lawrenceville; Steven T. Jaffe, Freehold, both of N.J.; Christopher H. Strolle, Glenside, Pa.

[73] Assignee: SamSung Electronics Co., Ltd., Kyungki-do, Rep. of Korea

[21] Appl. No.: 239,848

[22] Filed: May 9, 1994

Related U.S. Application Data

[63] Continuation of Ser. No. 851,019, Mar. 13, 1992, abandoned.

[51] Int. Cl.$^6$ .............................. H04N 7/12; G06K 9/36
[52] U.S. Cl. .......................... 382/232; 348/403; 348/422; 358/433
[58] Field of Search .............................. 382/56; 348/403, 348/422; 358/430, 429, 431, 432, 433, 262.1

[56] References Cited

U.S. PATENT DOCUMENTS

| | | | |
|---|---|---|---|
| 4,845,559 | 7/1989 | Labit et al. | 358/133 |
| 5,047,852 | 9/1991 | Hanyu | 358/141 |
| 5,051,840 | 9/1991 | Watanabe et al. | 382/56 |
| 5,121,216 | 6/1992 | Chen et al. | 382/56 |
| 5,122,875 | 6/1992 | Rachaudhuri et al. | 358/141 |

OTHER PUBLICATIONS

R. M. Gray, "Vector Quantization", Apr. 1984, pp. 4–26 IEEE ASSP Magazine, 1, No. 2.
Lee et al., "A study on New DCT–Based Bit Rate Reduction Algorithm and Variable Speed Playback for a Home–Use Digital VCR", Aug. 1992, pp. 236–242.
Yashima et al., "HDTV/Standard TV Compatible Coding Based on DCT", 1990.

Primary Examiner—Stephen Chin
Assistant Examiner—Timothy J. May
Attorney, Agent, or Firm—Robert E. Bushnell

[57] ABSTRACT

Television images to be digitally recorded are divided into blocks and the discrete cosine transform DCT of each block is taken. The DC coefficient of each DCT block is scalar-quantized, and its AC coefficients are classified-vector-quantized (CVQ). The square of the value that part or all the AC coefficients among horizontal AC coefficients including a first AC coefficient and vertical AC coefficients including a second AC coefficient, according to the zigzag scanning sequence of DCT block, are subtracted from a representative value of a preset reference class. Using a multilevel compression method, lowest level codes are vector-partitioned by P-units at equal intervals with respect to each classified DCT block, and code books of representative vectors corresponding to the partitioned vectors are provided. Indices of corresponding representative vectors in respective code books and the classified codes are taken as encoding data corresponding to AC coefficients to keep a constant number of bits in the lowest level codes. Then, errors created in a preceding level are corrected. Code books of S-units of representative vectors corresponding to the errors are provided again, and corresponding indices and parity data in the respective code books are provided. Here, codes are output in which an image is more compactly compressed in lower levels, and higher levels have more elaborate picture quality. During tape recording, the codes descriptive of the scalar quantized DC term, the classification of the AC terms and the lowest-level vector-quantization index for each successive DCT block are grouped together for recording in a respective one of regularly spaced equal-length segments of the recording tracks. Decoding is performed in the reverse sequence of encoding. During a high speed search, only lowest level codes having a constant number of bits are decoded regardless of the complexity of the picture, so that picture quality is good enough to discern the nature of the images.

20 Claims, 4 Drawing Sheets

FIG. 1

|  | X 01 | X 02 | X 03 | X 04 | X 05 | X 06 | X 07 |
|---|---|---|---|---|---|---|---|
| DC | 0 | 4 | 5 | 13 | 14 | 26 | 27 |
| Y 10 | 1 | 3 | 6 | 12 | 15 | 25 | 28 | 41 |
| Y 20 AC | 2 | 7 | 11 | 16 | 24 | 29 | 40 | 42 |
| Y 30 | 8 | 10 | 17 | 23 | 30 | 39 | 43 | 52 |
| Y 40 | 9 | 18 | 22 | 31 | 38 | 44 | 51 | 53 |
| Y 50 | 19 | 21 | 32 | 37 | 45 | 50 | 54 | 59 |
| Y 60 | 20 | 33 | 36 | 46 | 49 | 59 | 58 | 60 |
| Y 70 | 34 | 35 | 47 | 48 | 56 | 57 | 61 | 62 |

IMAGE COMPRESSION ENCODING AND DECODING METHOD AND APPARATUS THEREFOR

This is a continuation of application Ser. No. 07/851,019, filed 13 Mar. 1992 now abandoned.

BACKGROUND OF THE INVENTION

The present invention relates to an image compression encoding and decoding method and apparatus therefor, and more particularly to an image compression coding and decoding method and apparatus therefor which, using a multilevel compression method, reproduces pictures without degradation of picture quality during a special playback such as a high speed search.

Recently, video information compressing technology has been used in processing a video signal as digital data in digital video apparatus such as digital VCR, HDTV, digital video camera and video phone.

Since known image compression technology has a variable number of compressed coding bits according to picture complexity, a problem has been raised about how to keep constant a compression result in digital VCRs, HDTVs and others which require a constant compression result. Especially, for image compression for a DVCR, since its recording medium is magnetic tape which enables only sequential recording and playback, it has more limitations than that of an ordinary transmission line or disk (CD or hard disk). The most serious problem to be solved is a special playback function (also known as trick play) such as a high speed search.

For a solution, when an image compression method and its tape format are selected, movement of the VCR head (head's scan trace) during recording and playback should be considered. In other words, for special functions such as a high speed search, during compression, each image should be exactly the same size, and a portion of data on a tape should correspond to the image's original screen position and be reproduced regardless of other images.

Generally however, during coding, a complicated portion of an image requires a relatively large amount of bits and a simple portion relatively few bits. Accordingly, when video signals corresponding to one picture or its one segment are to be encoded and recorded in a track having a limited length of magnetic tape, and if the number of encoded bits exceed one track, a conventional digital VCR method records the excess of the encoded bits in a next track or, if the encoded bits reach the number of set bits, stops coding the remaining part which is discarded.

However, the recording method of the excess of the encoded bits in a next track has difficulty in a special playback or high speed search, and the coding stop method deteriorates the quality of a reproduced picture because of partial loss of its picture information.

SUMMARY OF THE INVENTION

Therefore, it is an object of the present invention to provide an image compression coding method and apparatus therefor which, using a multilevel compression method, more compactly compresses lower levels of an image to output a result having a constant number of bits and outputs an encoded result having components leading to more elaborate picture quality in higher levels, so that one picture has a constant bit rate.

It is another object of the present invention to provide an image compression decoding method and apparatus therefor which records, on magnetic tape, codes produced by a multilevel compression method which more compactly compresses lower levels of image to output a result having a constant number of bits and outputs an encoded result having components leading to more elaborate picture quality in higher levels, and decodes only the lowest level codes in a special playback mode such as a high speed search differently from a normal playback mode where the entire codes are decoded, thereby enabling a special playback function.

To accomplish the objects, in the image compression encoding and decoding method and apparatus therefor of the present invention, DC coefficients of a DCT block are scalar-quantized and AC coefficients are classified-vector-quantized (CVQ). Respective DCT blocks are classified by the least value of the square of the value that part or all of the AC coefficient among horizontal AC coefficients including a first AC coefficient according to the zigzag scanning sequence of a DCT block, and vertical AC coefficients including a second AC coefficient are subtracted from a representative value of a preset reference class. Using the multilevel compression method, lowest level codes are vector-partitioned by P-units at equal intervals with respect to each classified DCT block, and code books of representative vectors corresponding to the partitioned vectors are provided. Indices of corresponding representative vectors in respective code books and the classified codes are provided as encoding data corresponding to AC coefficients to keep a constant number of bits. Then, errors created in a preceding level are obtained. Code books of S-units of representative vectors corresponding to the errors are provided again. The multilevel CVQ of the method providing corresponding indices and parity data in the respective code books is performed to be encoded. Here, codes are output in which an image is more compactly compressed in lower levels, and higher levels have more elaborate picture quality.

Decoding is performed in the reverse sequence of encoding. During a high speed search, only the lowest level codes having a constant number of bits are restored regardless of the complexity of the picture so that a high speed search does not lead to deterioration of picture quality.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
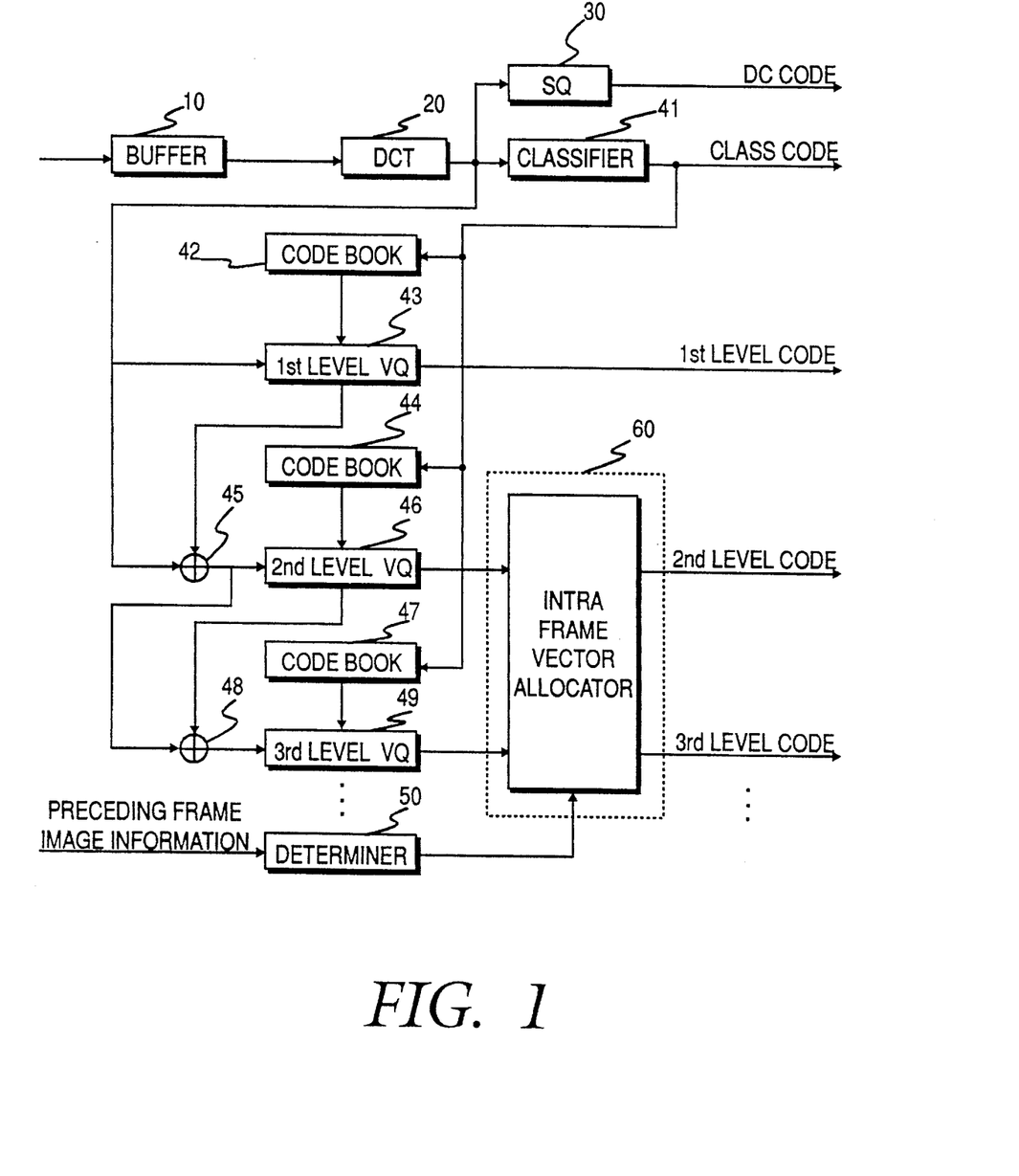
FIG. 1 is a block diagram of a video compression coder according to the present invention.

In FIG. 1, Y, R-Y, and B-Y video signals (4:2:2) input from a signal input source are subsampled with respect to a chrominance difference signal by a buffer 10 to be changed into the form of 4:2:0. That is, the form of 4:2:2 represents Y (width: 720 pixels, length: 480 pixels), R-Y and B-Y (width: 360 pixels, length: 480 pixels), while the form of 4:2:0 represents Y (width: 720 pixels, length: 480 pixels), R-Y and B-Y (width: 360 pixels, length: 240 pixels).

A DCT block 20 divides the two-dimensional video signal output from buffer 10 into N by N blocks (e.g., 8 by 8) and DCT-transforms each block to generate DCT coefficients. A DC encoder 30 scalar-quantizes (SQ) the DC values of DCT block 20 by eight bits and, for decoding, records them on tape.

Figure 3:
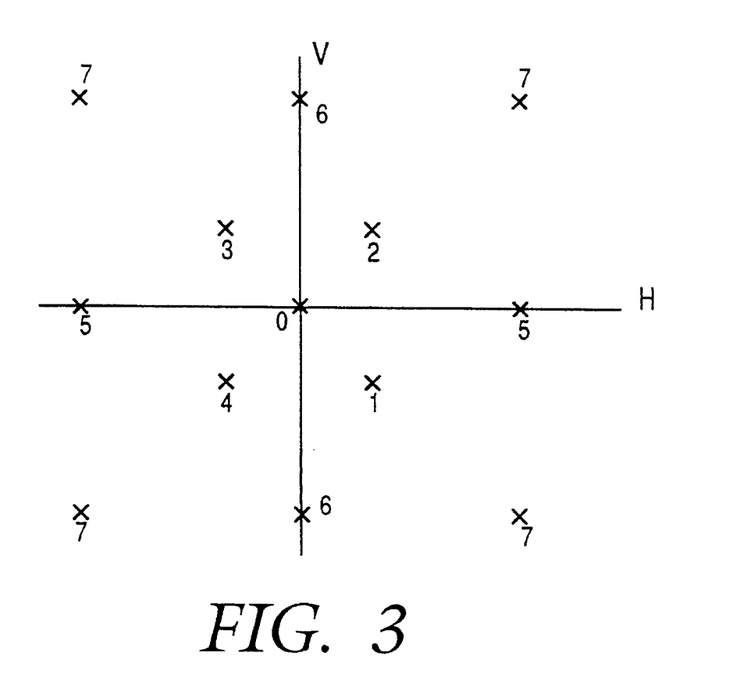
FIG. 3 illustrates a classification in the classifier for the video compression coder of FIG. 1.

A classifier 41 selects part or all the AC coefficient k among a horizontal AC coefficient including a first AC coefficient according to the zigzag scanning sequence of a DCT block and vertical AC coefficient including a second AC coefficient (here, x01 and y10). As shown in FIG. 3, edge direction is detected according to the minimum value of the square of the value from which representative values Yj of eight reference classes preset in the horizontal, vertical, diagonal and its opposing diagonal directions, are subtracted. According to the detected results, each DCT block is classified into eight classes. In other words, $$\text{class} = C, \; Yc \in \min dis(Yj,X) \quad (0 \leq j \leq 7)$$

$$dis(Yj,X) = \sum_{i=1}^{k} (yi - xii)^2 \quad X = (V,H)$$

$$\text{vertical AC coefficient } V = \sum_{i=0}^{j} |yi0| \quad (1 \leq j \leq 7)$$

$$\text{AC coefficient } H = \sum_{i=0}^{j} |y0i| \quad (yi0: \text{AC coefficient})$$

In other words, each DCT block is classified into a most approximate class by the V and H values on the coordinates of FIG. 3. Here, value j is more favorable as it becomes larger but may be selected according to the complexity of classifier 41. For decoding, these class codes are recorded on tape by three bits.

A first code book 42 contains 21 components and 128 vectors according to each class. A clustering algorithm (LBG algorithm) is used with respect to a transform coefficient relating to edge characteristic, among DCT coefficients. The LBG algorithm is disclosed in "An Algorithm for Vector Quantizer Design," by Y. Linde, A. Buzo and R. M. Gray, IEEE Trans.on Comm., vol. COM-28, pp. 84–95, Jan. 1980.

A first level vector quantization block 43 selects a code vector having the smallest error by comparing DCT input vectors with vectors of the code book, and outputs addresses that are indices of the vector as 7-bit compressed codes.

Figure 2:
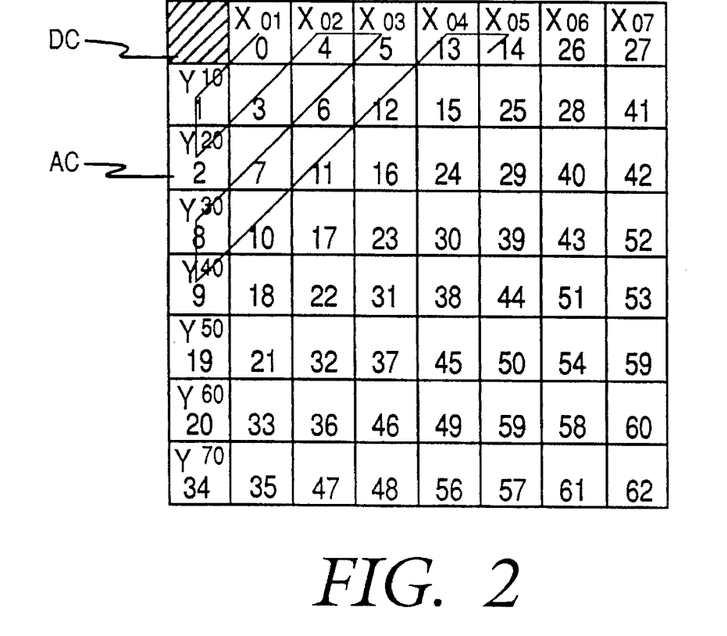
FIG. 2 illustrates DC and AC coefficients of an 8 by 8 DCT block.

In other words, the input DCT blocks are vector-partitioned by equal interval sampling to form three vectors. That is, as shown in FIG. 2, an 8 by 8 DCT block is zigzag-scanned and one-dimensionally arranged as follows.

VECTOR 0=(0, 3, 6, 9, 12, 15, 18, 21, 24, 27, 30, 33, 36, 39, 42, 45, 48, 51, 54, 57, 60)

VECTOR 1=(1, 4, 7, 10, 13, 16, 19, 22, 25, 31, 34, 37, 40, 43, 46, 49, 52, 55, 58, 61)

VECTOR 2=(2, 5, 8, 11, 14, 17, 20, 23, 26, 32, 35, 38, 41, 44, 47, 50, 53, 56, 59, 62)

This is based upon "Asymptotic Performance of Block Quantizer with Difference Distortion Measure," by Y. Yamada, S. Tazaki and R. M. Gray, IEEE Trans. inform. Theory, Vol. IT-26, pp. 6–14, Jan. 1980. Here, the reason the vectors are partitioned is to reduce the distortion of vector quantization. The whole distortion is as follows.

$$D1 \leq K(k) N^{-2/k} \sigma^2$$

$$\sigma^2 = [\det P]^{1/k} - \sigma g^2 - \pi (\sigma i^2)^{1/k}$$

Here, K(k) is a constant, [det P] is a correlation determinant, and N is a uniform probability in case of DC or a Laplacian probability in case of AC.

In the above equations, as value $\sigma^2$ becomes smaller, value D1 (distortion) becomes smaller. Therefore, in order to reduce the value of geometric dispersion $\sigma g^2$, the vector is partitioned because, when the values of the vector consist of both low-frequency components and high-frequency components of the DCT block, the value $\sigma g^2$ becomes smaller. The present invention is composed of three vectors to improve picture quality by about 2dB.

When a code vector having little error is selected, all 128 vectors are usually compared, which requires a considerable amount of operation. Thus, here, in order to reduce the amount of operation, all the vectors of code books 42, 44, and 47 are sorted according to a mathematic statistical value such as an activity or dispersion value. In other words, the search area of the code books is reduced to one quarter of their original search area by the mathematic statistical value such as the activity of vector or dispersion value so as to also reduce the amount of operation to one quarter.

Figure 4A:
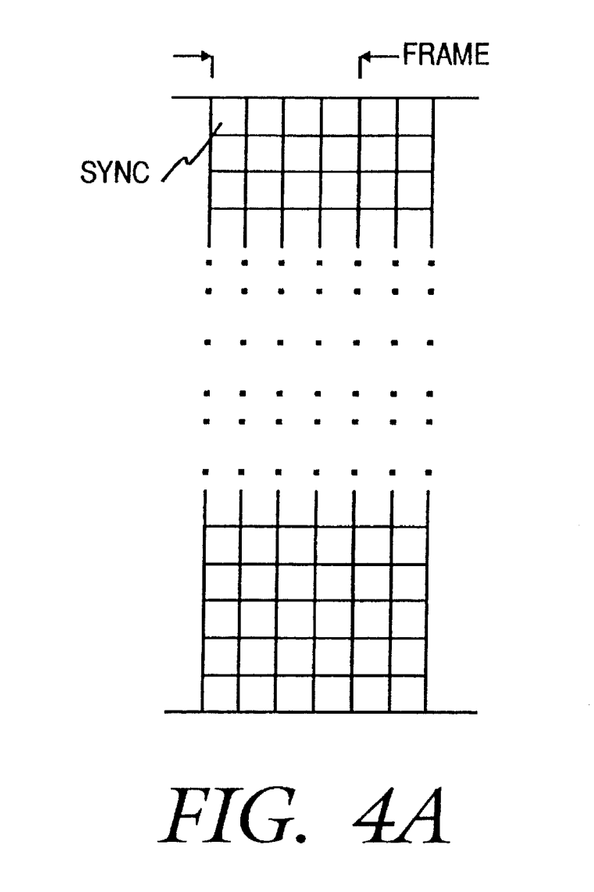
FIGS. 4A and 4B illustrate a tape format for the video compression coder of FIG. 1.
Figure 4B:
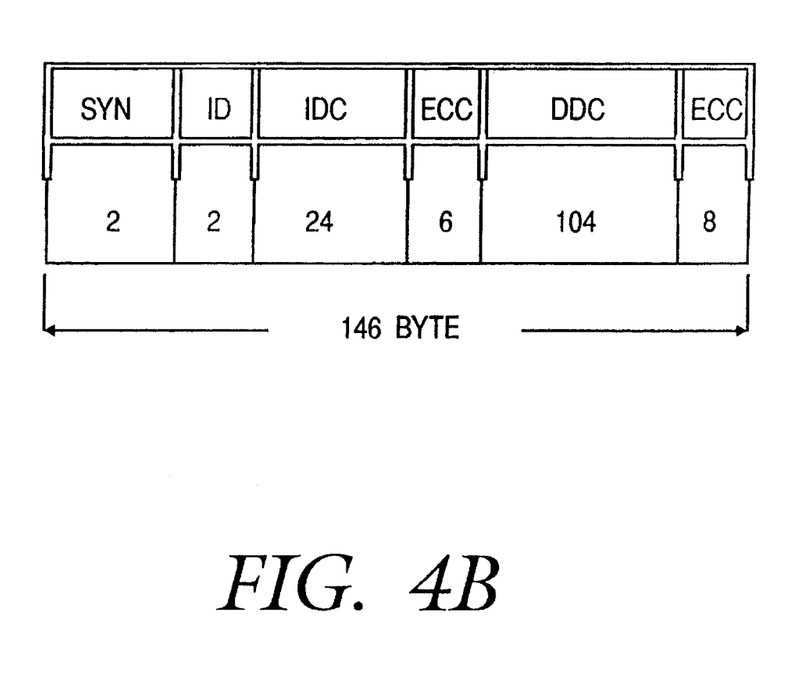

A first level code, which is the output of a first level vector quantization block 43, is compressed to 1/16. During special playback such as a high speed search, only the first level code is reproduced. During normal playback, the first level code is reproduced along with a higher level code. Even only with the first level code, image can be obtained. When recorded on tape, as shown in FIGS. 4A and 4B, the first level code is recorded on an independent decodable code (IDC) region. The code has a total of 21 bits where each vector has seven bits, and decoding requires at least 32 bits (8 DC bits+3 class bits+21 vector bits).

Second and third code books 44 and 47 each have seven components and 128 vectors. A first subtracter 45 subtracts an encoding result in first level vector quantization block 43, that is, the vectors of first code book 42 corresponding to selected indices, from the whole AC coefficients of DCT block 20 except its DC, to determine the errors produced during the lowest level encoding of each DCT block 20.

A second level vector quantization block 46 vector partitions the errors produced during the lowest level encoding of each DCT block 20 into nine vectors, by equal-interval sampling. A second subtracter 48 subtracts an encoding result in the second level vector quantization block 46 from the AC coefficients of the errors produced during the lowest level encoding of each DCT block 20, as supplied from the subtracter 45, to determine remnant errors after the second level encoding, for encoding in third level vector quantization block 49. In other words, image cannot be reproduced only with the second and third level vector codes but should be necessarily reproduced along with the lowest level code.

Meanwhile, a parameter determiner 50 determines an encoding parameter of the image of a current picture, based upon an encoding result of the video signal of a preceding picture. As the encoding result of a preceding image, if the number of required bits are smaller than that of reference bits set for one frame, the value of the parameter is controlled to require a larger number of bits in encoding a current image, and if the number of required bits is larger than that of the reference bits set for one frame, the value of the parameter is controlled to require a smaller number of bits in encoding a current image. Here, data transmission speed M of DVCR is 20 megabits per second (Mbps). As one second needs 30 frames, the number b of reference bits for one frame is b=M/30. In other words, if the difference between the required bits and reference bits is larger than a preset value, the parameter is determined considering the number of the reference bits by the vector distribution according to its activity.

An intraframe vector allocator 60 adaptively allocates vectors by the parameter determined by parameter determiner 50.

Even if the number of vectors to be encoded in second and third level vector quantization blocks 46 and 49 is 18, since only about nine vectors are allowed to be encoded considering the number of reference bits, only vectors having an activity above a proper size (threshold value) are actually encoded. The activity of each vector is defined as follows.

$$\text{activity} = \sum_{i=0}^{7} |yi| \quad (yi: \text{vector component})$$

Here, the threshold value (parameter:THR) is determined by the encoding state of a preceding image, that is to say, transfer vectors from second and third level vector quantization blocks 46 and 49.

Transfer Vector=Vj, (jεActj>THR), (0≦j≦8)

Though the bits of the second and third level encoding codes are fixed in one frame, they can be varied in units of a sync block. In other words, as shown in FIG. 4A, one frame has four tracks and one sync bloc has six DCT blocks. The sync block comprises a sync signal for indicating the beginning and end of the block, an index signal for indicating a position in a frame, a first level quantization encoding code contained in an IDC area, an error correction code (ECC) for error-correcting the code loaded on the IDC area, the plurality of vector quantization encoding codes contained in a dependent decodable code (DDC), and an ECC for error-correcting the code loaded on the DDC area.

If the required number of bits exceeds the reference number of bits, the amount of bits in the periphery of the image is forced to be cut. The image on the periphery is reproduced only with the lowest level code. This means that the center and the periphery of the image are encoded using different weights. This is possible because normal human vision will concentrate mainly on the center of an image.

Higher level codes are sequentially recorded on the DDC area shown in FIGS. 4A and 4B when recorded in tape. The second level needs parity data of 9-bit parity data and the third level needs parity data of the number of bits of actual transfer vectors of the second level. The parity data indicates to a decoder which vector is actually recorded on a tape.

Here, without intraframe vector allocator 60, the reference bits are satisfied by only using differential encoding according to weights and by image sections. Good picture quality can be obtained even if the image is divided into a plurality of levels from the center to the periphery, so that the lowest level is uniformly encoded and higher levels are encoded by varying their parameters for each level.

From now on, the image compression decoding method of the present invention will be briefly described below. The decoding method is performed by the reverse order of the image compression coding method.

Figure 5:
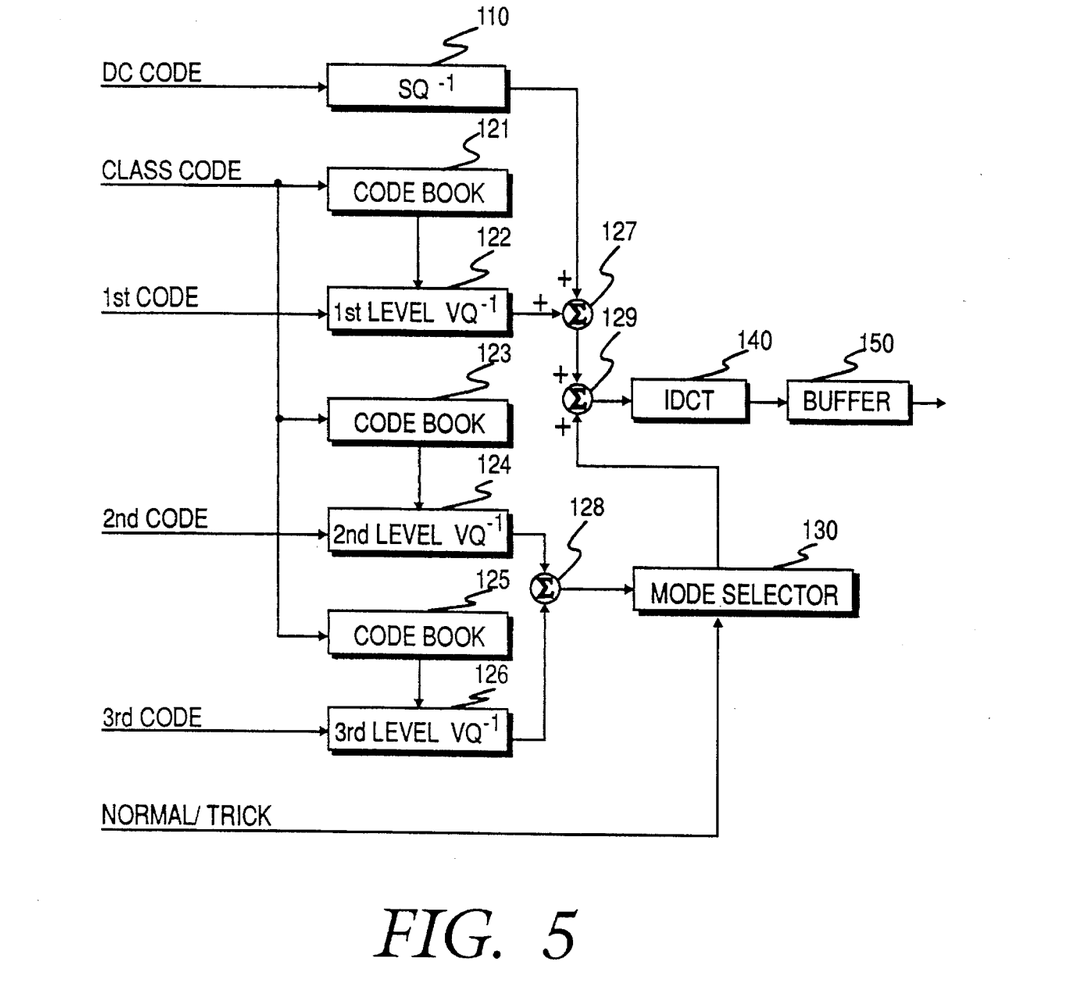
FIG. 5 is a block diagram of a video compression decoder according to the present invention.

In FIG. 5, a DC decoder 110 inverse-scalar-quantizes an 8-bit DC code reproduced from a tape, and decodes it with DC coefficients. A first code book 121, which is the same as code book 42 of FIG. 1, has 21 components and 128 vectors. Second and third code books 123 and 125, which are the same as code books 44 and 47 of FIG. 1, each have 7 components and 128 vectors. Each code book 121, 123 and 125 outputs its vector according to an input class code.

A first level vector inverse-quantization block 122 outputs a corresponding vector component by comparing a first level code and the code of code book 121. The decoding result of the first level code and the DC coefficients are supplied to a first adder 127. Second and third level vector inverse-quantization blocks 124 and 126 output a corresponding vector component by the comparison of second and third level codes loaded on the DDC area and the codes of code books 123 and 125. The decoding results of the second and third level codes are supplied to a second adder 128.

Meanwhile, according to a normal/trick playback control signal for indicating whether a VCR is in a normal playback or special playback mode, a mode selector 130 supplies the outputs of second and third level vector inverse-quantization blocks 124 and 126 to a third adder 129, during normal playback. During a trick playback such as high speed search, since only the lowest level code is reproduced according to the VCR characteristic and the higher level codes are not reproduced, mode selector 130 supplies a null signal to third adder 129.

Third adder 129 adds the DC and the decoding results of the respective levels, and an inverse-DCT block 140 inverse-DCT transforms the added outputs to be converted into an original two-dimensional video signal. A buffer 150 changes the inverse-DCT result into an output form, that is, changes the result of 4:2:0 form into 4:2:2 form.

As described above in detail, the image compression encoding and decoding method and apparatus therefor of the present invention compresses DCT blocks by steps, using classified vector quantization via a multilevel compression method so that, during a special playback mode such as high speed search, only the lowest level image having a fixed number of bits is reproduced to cause no degradation of picture quality during the special playback mode.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. An image compression encoding method for a video signal that describes a sequence of television image frames, some of said television image flames including images of objects having edges that are directed in various directions, said image compression encoding method comprising:

a discrete-cosine transform generation step wherein each said television image frame is segmented into a plurality of closely packed non-overlapping image blocks arranged in rows and in columns, each said image block being of prescribed height and width dimensions, portions of the video signal descriptive of each said image block being transformed to a respective two-dimensional discrete cosine transform block, each said discrete cosine transform block being composed of a respective plurality of coefficients each manifested as a respective electrical signal, one of said coefficients being a direct-current coefficient and the others of said coefficients being alternating-current coefficients in two-dimensional spatial frequency;

a scalar quantization step for scalar quantizing the direct-current coefficient of each said discrete cosine transform block, thereby generating a respective direct-current code for each said discrete cosine transform block, each said respective direct-current code having exactly n bits therein;

a classification step for classifying the alternating-current coefficients of each said discrete cosine transform block as belonging to a selected one of m classes, thereby generating a respective class code for each said discrete cosine transform block;

a first-level vector quantization step for approximating a vector formed from the classified alternating-current coefficients of each said discrete cosine transform block with a selected one of f first-level approximation vectors prescribed for each class, and identifying the selected one of said first-level approximation vectors by a respective first index having exactly g bits therein, said selected first-level approximation vector providing an approximation of said vector formed from the classified alternating-current coefficients of each said discrete cosine transform block with no more error than any other of said first-level approximation vectors prescribed for said selected class, said respective first index having exactly g bits and being supplied as a first-level code for each said discrete cosine transform block, the direct-current code and the class code and the first-level code for each said discrete cosine transform block together forming an independently decodable code having a number B of encoding bits that is a positive integer equal to the quantity $n+(\log_2 m)+f g$ or the closest positive integer rounding upward from said quantity, f, g, m, and n being positive integers of predetermined respective values so that the number B is unchanging;

a step of determining after each said first-level vector-quantization step on one said discrete cosine transform block whether a first prescribed amount of permissible vector-quantization error is exceeded by a first-level error vector that is defined by all the alternating-current coefficients of said one discrete cosine transform block decremented by corresponding ones of the alternating-current coefficients of the first-level approximation vector selected in said first-level vector quantization step on said one said discrete cosine transform block;

a second-level vector quantization step of approximating each said first-level error vector that exceeds said first prescribed amount of permissible vector-quantization error with a selected one of a plurality of second-level approximation vectors prescribed for said selected class, said selected second-level approximation vector providing an approximation of said first-level error vector with no more error than any other of said second-level approximation vectors prescribed for said selected class, and identifying said selected second-level approximation vector with a respective second index, thereby generating a second-level code for each said discrete cosine transform block the respective first-level error vector of which exceeds said first prescribed amount of permissible vector-quantization error, said second-level code depending for its decoding on the first-level code for the same discrete cosine transform block and being included in a dependently decodable code for said same discrete cosine transform block;

a step of determining after each said second-level vector-quantization step on one said discrete cosine transform block whether a second prescribed amount of permissible vector-quantization error is exceeded by a second-level error vector that is defined by all the alternating-current coefficients of said one said discrete cosine transform block decremented by corresponding ones of the alternating-current coefficients of the first-level approximation vector selected in said first-level vector quantization step on said one said discrete cosine transform block and further decremented by corresponding ones of the alternating-current coefficients of the second-level approximation vector selected in said second-level vector quantization step on said one said discrete cosine transform block;

a third-level vector quantization step of approximating each said second-level error vector that exceeds said second prescribed amount of permissible vector-quantization error, with a closest one of a plurality of third-level approximation vectors prescribed for said selected class, said selected third-level approximation vector providing an approximation of said second-level error vector with no more error than any other of said third-level approximation vectors prescribed for said selected class, and identifying said selected third-level approximation vector with a respective third index, thereby generating a third-level code for each said discrete cosine transform block the respective second-level error vector of which exceeds said second prescribed amount of permissible vector-quantization error, said third-level code depending for its decoding on the first-level code and the second-level code for the same discrete cosine transform block and being included in said dependently decodable code for said same discrete cosine transform block; and an intra-frame vector allocation step of determining prior to encoding each next television image frame the quantity of bits by which the result of encoding an immediately preceding television image frame departed from a number of bits prescribed for each television image frame, and using that quantity as an error signal in a degenerative feedback subroutine that adjusts at least one of said first and second prescribed amounts of permissible vector-quantization error during encoding of said next television image frame, for controlling the number of bits said second-level and third-level vector quantization steps together contribute for inclusion in said dependently decodable codes within each successive television image frame;

said image compression encoding method included within a method using a helical-scanning tape recorder for tape recording a digital electric signal representative of said discrete cosine transform blocks on a tape along parallel tracks crossing a surface of said tape at a prescribed skew angle;

in which said method for tape recording said digital electric signal, successive independently decodable codes generated for each said discrete cosine transform block by said scalar quantization, classification and first-level vector quantization steps are recorded at a predetermined bit rate in regularly spaced equal-length segments of said tracks, as respective portions of said digital electric signal; and in which said method for tape recording, said dependently decodable codes are recorded in portions of said tracks between said regularly spaced equal-length segments, as respective further portions of said digital electric signal.

2. An image compression encoding method as claimed in claim 1, wherein in said classification steps the alternating-current coefficients of each said discrete cosine transform block are considered to be in a respective two-dimensional coefficient array, in which said coefficient array the alternating-current coefficients of each said discrete cosine transform block are arranged in consecutively numbered columns ascending from zeroeth in accordance with ascending horizontal spatial frequency as a first dimension, and in which said coefficient array the alternating-current coefficients of each said discrete cosine transform block are arranged in consecutively numbered rows ascending from zeroeth in accordance with ascending vertical spatial frequency as a second dimension;

the alternating-current coefficients of each said discrete cosine transform block are zigzag scanned along diagonals of said coefficient array in accordance with a prescribed zigzag scanning sequence, proceeding from one of the two alternating-current coefficients closest to the corner of the coefficient array where horizontal and vertical spatial frequencies are both zero, each diagonal of the coefficient array being consecutively numbered beginning with first in accordance with increase in distance of each said diagonal from the corner of the coefficient array where horizontal and vertical spatial frequencies are both zero; and using the alternating-current coefficients in a group arrayed along a number of consecutively numbered diagonals of each said discrete cosine transform block including at least the first diagonal thereof, for selecting which of preset reference classes said discrete cosine transform block is classified in, according to the least value of the mean square of the values by which the alternating-current coefficients depart from corresponding ones of representative values for said preset reference classes.

3. An image compression encoding method as claimed in claim 1, wherein in each of said first-level, second-level and third-level vector quantization steps, the approximation vectors are separated by equal sampling intervals.

4. An image compression encoding method as claimed in claim 1, wherein in each said first-level vector quantization step, three approximation vectors provide equal-interval samplings, and in each said second-level vector quantization step and each said third-level vector quantization step, nine approximation vectors provide equal-interval samplings.

5. An image compression encoding method as claimed in claim 1, wherein in each said first-level vector quantization step, variables n, m, f, and g have 8, 8, 3, and 7 bits, respectively, so that the overall number of bits is 32 for every block.

6. An image compression encoding method as claimed in claim 1, wherein in said first-level, second-level and third-level vector quantization steps, all the approximation vectors selected for that vector quantization step are sorted according to respective sets of statistical values therefor such as activity and dispersion values;

wherein said first-level vector quantization step for approximating a vector formed from the classified alternating-current coefficients of each said discrete cosine transform block with a said selected one of f first-level approximation vectors prescribed for each class comprises substeps of:

determining a set of said statistical values for said vector formed from the classified alternating-current coefficients of each said discrete cosine transform block, and searching for said closest one of said first-level approximation vectors prescribed for each class without considering those approximation vectors with respective sets of said statistical values that depart more than a first prescribed amount from said set of said statistical values determined for said vector formed from the classified alternating-current coefficients of each said discrete cosine transform block;

wherein said second-level vector quantization step for approximating a first-level error vector with a closest one of a plurality of second-level approximation vectors prescribed for each class comprises substeps of:

determining a set of said statistical values for said first-level error vector, and searching for said selected one of said second-level approximation vectors prescribed for each class without considering those approximation vectors with respective sets of said statistical values that depart more than a second prescribed amount from said set of said statistical values determined for said first-level error vector; and wherein said third-level vector quantization step for approximating said second-level error vector with said selected one of a plurality of third-level approximation vectors prescribed for each class comprises substeps of:

determining a set of said statistical values for said second-level error vector, and searching for said selected one of said third-level approximation vectors prescribed for each class without considering those approximation vectors with respective sets of said statistical values that depart more than a third prescribed amount from said set of said statistical values determined for said second-level error vector.

7. An image compression encoding method as claimed in claim 1, wherein in said intra-frame vector allocation step, said degenerative feedback subroutine reduces the number of bits generated by said second-level and third-level vector quantization steps, as required to keep frame coding rate uniform, by a progression in which the third-level codes for discrete cosine transform blocks are not included within said dependently decodable codes recorded as respective further portions of said digital electric signal, the non-inclusion of said third-level codes beginning at the outer edges of the television image frame and working towards the center of the television image frame as further reduction in the number of bits generated by said second-level and third-level vector quantization steps is required to keep frame coding rate uniform, and in which, if in order to keep frame coding rate uniform still further reduction in the number of bits generated by said second-level and third-level vector quantization steps is required after all said third-level codes for said discrete cosine transform blocks for the television image frame are not included in said dependently decodable codes recorded as respective further portions of said digital electric signal, the second-level codes for said discrete cosine transform blocks are not included within said dependently decodable codes recorded as respective further portions of said digital electric signal, the non-inclusion of said second-level codes beginning at the outer edges of the television image frame and working towards the center of the television image frame as said still further reduction in the number of bits generated by said second-level and third-level vector quantization steps is required to keep frame coding rate uniform.

8. An image compression encoding method as claimed in claim 1, wherein said method for tape recording a digital electric signal is such that the digital electric signal recorded along the length of each said track is parsed into a succession of sync blocks each containing a standard number of bits, and wherein said sync block is recorded in a standardized format comprising:

a sync signal for indicating the beginning of the sync block, recorded in a respective one of sync-signal areas at regular intervals along one of said tracks;

a position-index signal for indicating a position of the sync block within a frame, recorded in a respective one of position-index-signal areas at regular intervals along said one of said tracks;

an independently decodable code portion composed of a prescribed number of at least one of said independently decodable codes, each of said independently decodable codes including the direct-current code, the class code and the first-level code descriptive of a respective one said discrete cosine transform block;

a first error correction code for error-correcting each of said prescribed number of said independently decodable codes, said first error correction codes being recorded together with said independently decodable code in a respective one of said independently decodable code portion at regular intervals along said one of said tracks;

a dependently decodable code portion composed of dependently decodable codes including said second-level and third-level codes; and a second error correction code for error correcting each dependently decodable code in said dependently decodable code portion recorded together with said dependently decodable code portion in a respective one of dependently decodable code areas at regular intervals along said one of said tracks; said respective one of said sync-signal areas being followed in the forward direction of recording by said respective position-index-signal area, said respective independently decodable code area and said respective dependently decodable code area.

9. An image compression encoding method as claimed in claim 8, wherein said respective sync-signal area is followed in the forward direction of recording by said respective index-signal area, said respective independently decodable code area and said respective dependently decodable code area in the order of their naming in this claim.

10. A compression encoder for images, comprising:

means responsive to portions of a video signal descriptive of respective ones of a plurality of closely packed non-overlapping image blocks arranged in rows and in columns within each television frame, each said image block being of prescribed height and width dimensions, and generating a discrete cosine transform of each said image block at a predetermined compression rate, each of said discrete cosine transform blocks being composed of a respective plurality of coefficients each manifested as a respective electrical signal, one of said coefficients being a direct-current coefficient and the others of said coefficients being alternating-current coefficients in two-dimensional spatial frequency;

direct-current encoding means for scalar-quantizing the respective direct-current coefficient of each said discrete cosine transform block, thereby generating a respective direct-current code;

classifier means for classifying the respective alternating-current coefficients of each said discrete cosine transform block in a selected one of m classes, m being a positive integer, and generating a respective class code descriptive of the selected class;

first-level vector quantization means for approximating a vector formed from the classified alternating-current coefficients of each said discrete cosine transform block with a selected one of a respective set of f representative vectors for said selected class for that said discrete cosine transform block, which selected one of said set of f representative vectors approximates said vector formed from the classified alternating-current coefficients of that said discrete cosine transform block with no more error than any other of said f representative vectors, each of which f representative vectors is identifiable by a respective g-bit index, and for supplying as a first supplied index the g-bit index of the representative vector of each said discrete cosine transform block selected as its respective first-level-vector-quantization approximating vector, f and g being positive integers each larger than one;

means for determining error in first-level vector-quantization, caused by said first-level vector quantization means approximating the classified alternating-current coefficients of each said discrete cosine transform block by said respective first-level-vector-quantization approximating vector, including a first electronic subtraction apparatus for determining differences between the classified alternating-current coefficients of each said discrete cosine transform block and corresponding alternating-current coefficients of said respective first-level-vector-quantization approximating vector for that said discrete cosine transform block, thereby generating a respective first-level error vector for that said discrete cosine transform block;

second-level vector quantization means for approximating said respective first-level error vector for each said discrete cosine transform block with a selected one of a respective set of h representative vectors for said selected class for that said discrete cosine transform block, which said selected one of said respective set of h representative vectors approximates said first-level error vector with no more error than any other of said h representative vectors, h being a positive integer, each of which h representative vectors is identifiable by a respective g-bit index, and for supplying as a second supplied index the g-bit index of the representative vector of each said discrete cosine transform block selected as its respective second-level-vector-quantization approximating vector, on condition that said respective first-level error vector exceeds a first prescribed amount of permissible vector-quantization error;

means for determining error in said first-level vector quantization not accounted for in said second-level vector quantization, caused by said second-level vector quantization means approximating the alternating-current coefficients of said respective first-level error vector for each said discrete cosine transform block by said respective second-level-vector-quantization approximating vector, including a second electronic subtraction apparatus for determining differences between the alternating-current coefficients of said respective first-level error vector for each said discrete cosine transform block and corresponding alternating-current coefficients of said respective second-level-vector-quantization approximating vector for that said discrete cosine transform block, thereby generating a respective second-level error vector for that said discrete cosine transform block;

third-level vector quantization means for approximating said respective second-level error vector for each said discrete cosine transform block with a selected one of a respective set of h representative vectors for said selected class for that said discrete cosine transform block, which said selected one of said respective set of h representative vectors approximates said second-level error vector with no more error than any other of said set of h representative vectors being a positive integer, each of which h representative vectors is identifiable by a respective g-bit index, and for supplying as a third supplied index the g-bit index of the representative vector of each said discrete cosine transform block selected as its respective third-level-vector-quantization approximating vector, on condition that said respective second-level error exceeds a second prescribed amount of permissible vector-quantization error;

means for assembling the direct-current code, the class code, and each said first, second and third supplied index descriptive of each said discrete cosine transform block into said digital electric signal for transmission through a medium with limited bandwidth; and intra-frame vector allocation means for determining, prior to encoding each next one of said television image frames, the quantity of bits by which the result of encoding of an immediately preceding one of said television image frames departed from a number of bits prescribed for each television image frame, and using said quantity as an error signal in a degenerative feedback arrangement that adjusts at least one of said first and second prescribed amounts of permissible vector-quantization error during encoding of said next television image frame, for controlling the total number of bits said second-level and third-level vector quantization means together generate within each of said successive television image frames.

11. For use with a tape recorded along parallel tracks crossing a surface thereof at a skew angle, a method for recovering video signal from said tape by means including a tape transport provided with helically scanning playback heads and playback amplifier, a succession of sync blocks each comprising a respective first portion including independently decodable codes therewithin and a respective second portion including dependently decodable codes therewithin, and being recorded in parallel tracks on the tape, said method for recovering the video signal from said tape including:

during a relatively slow playback mode, transporting said tape at a relatively slow playback tape velocity for helical scanning by said playback heads along said parallel tracks, thereby to play back through said playback amplifier both said first portions and said second portions of said succession of sync blocks recorded along said parallel tracks on said tape;

during a relatively fast playback mode, transporting said tape at a multiple of said relatively slow playback tape velocity for helical scanning by said playback heads across said parallel tracks, thereby to play back through said playback amplifier said first portions of said succession of sync blocks recorded along said parallel tracks on said tape; and a compression decoding method for responding to those portions of said succession of sync blocks as played back through said playback amplifier, when said succession of sync blocks is descriptive of a video signal encoded in accordance with a compression encoding method having steps in which two-dimensional discrete-cosine-transforms of blocks of said video signal are generated, followed by steps in which said discrete cosine transforms are classified for selecting codebooks and generating class codes indicative of which codebooks are selected and steps in which scalar quantization of direct-current terms of said discrete cosine transforms and multilevel vector quantization of alternating-current terms of said discrete cosine transforms are implemented using the selected codebooks for supplying respective codes for said scalar quantization of direct-current terms of said discrete cosine transforms and for each level of said multilevel vector quantization of alternating-current terms of said discrete cosine transforms, the multilevel vector quantization of the alternating-current terms of each of said discrete cosine transforms always including first-level vector quantization of those alternating-current terms and if there is substantial error in the first-level vector quantization of those alternating-current terms that multilevel vector quantization including at least one further level of vector quantization, said digital signal including for each of said discrete cosine transforms its class code accompanied by its respective codes for said scalar quantization of its direct-current term and for said multilevel vector quantization of its alternating-current terms, the codes formed by the scalar quantization of direct-current terms of said discrete cosine transforms and by the first-level vector quantization of alternating-current terms of said discrete cosine transforms being decodable independently of other codes than their accompanying class code, and the codes formed by each further level of multilevel vector quantization of alternating-current terms of said discrete cosine transforms being decodable only in dependence on preceding levels of said multilevel vector quantization as well as on their accompanying class code, said image compression decoding method comprising the steps of:

considering in turn the codes of each discrete cosine transform that are contained in said video signal or segments thereof as played back through said playback amplifier;

performing inverse scalar quantization of the code for said scalar quantization of the direct-current term of each said discrete cosine transforms, thereby regenerating the direct-current term of the one of said discrete cosine transforms being currently considered;

selecting, responsive to said class code for the one of said discrete cosine transforms being currently considered, a respective codebook for performing on said discrete cosine transform being currently considered each inverse vector quantization, said selected codebook being of a type for decoding code generated from the codebook used during said compression encoding method and identified by said class code for the one of said discrete cosine transforms being currently considered;

performing first-level vector inverse-quantization of the code for said first-level vector quantization of the alternating-current terms of each said discrete cosine transforms in accordance with the codebook selected for each such operation responsive to said class code, thereby regenerating first-level approximations to the alternating-current terms of the one of said discrete cosine transforms being currently considered;

during at least said relatively slow playback mode, performing vector inverse-quantization of the code for each said further level of the vector quantization of the alternating-current terms of each said discrete cosine transform in accordance with the codebook selected for each such operation responsive to said class code, thereby generating corrections for the first-level approximations to the alternating-current terms of the one of said discrete cosine transforms being currently considered, and applying the corrections so generated to the first-level approximations to the alternating-current terms of the one of said discrete cosine transforms being currently considered to generate corrected alternating-current terms of the one of said discrete cosine transforms being currently considered;

during said relatively fast playback mode, inverse-discrete cosine transforming the direct-current term and the first-level approximations to the alternating-current terms of the one of said discrete cosine transforms being currently considered, for recovering said video signal with reduced resolution; and during said relatively slow playback mode, inverse-discrete cosine transforming the direct-current term and the corrected alternating-current terms of the one of said discrete cosine transforms being currently considered, for recovering said video signal.

12. For use with a tape digitally recorded along parallel tracks crossing said tape at a prescribed angle of skew, a combination of:

tape playback apparatus helically scanning along the tracks of said tape during a normal playback mode for retrieving therefrom a first digital electric signal descriptive of a video signal encoded in accordance with a compression encoding method having steps in which two-dimensional discrete-cosine-transforms of blocks of said video signal are generated, followed by steps in which said discrete cosine transforms are classified for selecting codebooks and class codes are generated indicative of which codebooks are selected and steps in which scalar quantization of direct-current terms of said discrete cosine transforms and multilevel vector quantization of alternating-current terms of said discrete cosine transforms are implemented using the selected codebooks, said tape playback apparatus helically scanning across the tracks of said tape during at least a first special playback mode in which tape velocity is altered from that during said normal playback mode, said first special playback mode being used during fast search of tape contents, and an image compression decoder, said image compression decoder improved for responding to said first digital electric signal being descriptive of multilevel vector quantization of said discrete cosine transforms, in which a first level of vector quantization for each of the discrete cosine transforms of said blocks of said video signal generates a respective first-level code with a prescribed number of bits therein, and in which those first-level codes descriptive of said blocks of said video signal within each field are disposed at evenly spaced intervals within the same track on said tape, said image compression decoder comprising:

apparatus providing inverse-discrete-cosine-transform response to a second digital electric signal descriptive of said two-dimensional discrete-cosine-transforms of said blocks of said video signal, thereby generating a third digital electric signal descriptive of said video signal, and a vector-quantization decoder responding to said first digital electric signal for generating said second digital electric signal, said vector-quantization decoder including:

direct-current decoder means for inverse scalar-quantizing direct-current codes to be decoded;

first-level inverse vector-quantization means for decoding each successive first-level code to generate a corresponding representative vector value according to one of a first set of inverse codebooks, as selected by the class code;

second-level inverse vector-quantization means for decoding each successive second-level code to generate a corresponding representative vector value according to one of a second set of inverse codebooks, as selected by the class code;

third-level inverse vector-quantization means for decoding each successive third-level code to generate a corresponding representative vector value according to one of a third set of inverse codebooks, as selected by the class code; and controller means for supplying said second digital electric signal as a first digital sum of the outputs of said direct-current decoder means and said first-level inverse vector-quantization means, as augmented by a second digital sum of the outputs of said second-level and said third-level inverse vector-quantization means during said normal playback mode, but not so augmented during each said special playback mode used during fast search of tape contents.

13. A combination as claimed in claim 12, wherein said controller means comprises:

first adder means for adding the outputs of said direct-current decoder means and said first-level inverse vector-quantization means;

second adder means for adding the outputs of said second-level and said third-level inverse vector-quantization means to generate said second digital sum;

third adder means for adding first and second digital sums supplied thereto to generate said second digital electric signal as a third digital sum, said first digital sum corresponding to said first digital sum; and mode selector means for, according to said normal playback and special playback modes selected by a user key input, supplying said second digital sum to said third adder means as said second digital sum during said normal playback mode and for supplying a zero-valued signal to said third adder means as said second digital sum during each said special playback mode.

14. An image compression encoding method for a video signal that describes a sequence of television image frames, some of which television image frames include images of objects having edges that are directed in various directions, said image compression encoding method comprising:

a discrete-cosine transform generation step wherein each television frame is segmented into a plurality of non-overlapping blocks of said video signal each of prescribed height and width dimensions arrayed by row and by column, each one of said blocks of said video signal being transformed to a respective two-dimensional discrete cosine transform block, each said discrete cosine transform block being composed of a respective plurality of coefficients each manifested as a respective electrical signal, one of said coefficients being a direct-current coefficient and the others of said coefficients being alternating-current coefficients in two-dimensional spatial frequency;

a scalar quantization step for scalar quantizing the direct-current coefficient of each said discrete cosine transform block by n bits, thereby generating a direct-current code for each said discrete cosine transform block;

a classification step for classifying the alternating-current coefficients of each said discrete cosine transform block into one of m classes, thereby generating a class code for each said discrete cosine transform block;

a first-level vector quantization step for approximating a vector formed from the classified alternating-current coefficients of each said discrete cosine transform block with a selected one of a plurality f in number of first-level approximation vectors prescribed for the class within which the alternating-current coefficients of said discrete cosine transform block are classified as belonging, and identifying said selected first-level approximation vector with a respective index having no more than g bits supplied as a first-level code for each said discrete cosine transform block;

at least one further-level vector quantization step of approximating, with the selected one of a plurality of respective error-approximation vectors, an error vector left after said first-level vector-quantization step for each said discrete cosine transform block exhibiting more than a prescribed permissible amount of error for said further-level vector quantization step, as defined by all the alternating-current coefficients of said discrete cosine transform block decremented by corresponding ones of alternating-current coefficients of each approximating vector selected in a preceding-level vector quantization step on said discrete cosine transform block, and identifying said selected approximation vector for each further vector quantization step with a respective index, thereby generating a respective further level code for each said discrete cosine transform block;

a step of formulating an independently decodable code from the direct-current code, the class code and the first-level code of each said discrete cosine transform block as each said discrete cosine transform block is scanned in a first prescribed order; and a step of formulating a dependently decodable code from the respective further level codes of each said discrete cosine transform block as they are scanned in a second prescribed order;

said image compression encoding method included within a method using a helical-scanning tape recorder for tape recording a digital electric signal on a tape along parallel tracks crossing a surface of said tape at a prescribed skew angle;

in which said method for tape recording said digital electric signal, successive independently decodable codes generated for each said discrete cosine transform block by said scalar quantization, classification and first-level vector quantization steps are recorded at a predetermined bit rate in regularly spaced equal-length segments of said tracks; and in which said method for tape recording said digital electric signal, said dependently decodable codes are recorded in portions of said tracks between said regularly spaced equal-length segments.

15. An image compression encoding method as claimed in claim 14, wherein in said classification steps the alternating-current coefficients of each said discrete cosine transform block are considered to be in a respective two-dimensional coefficient array, in which said coefficient array the alternating-current coefficients of each said discrete cosine transform block are arranged in consecutively numbered columns ascending from zeroeth in accordance with ascending horizontal spatial frequency as a first dimension, and in which said coefficient array the alternating-current coefficients of each said discrete cosine transform block are arranged in consecutively numbered rows ascending from zeroeth in accordance with ascending vertical spatial frequency as a second dimension;

the alternating-current coefficients of each said discrete cosine transform block are zigzag scanned along diagonals of said coefficient array in accordance with a prescribed zigzag scanning sequence, proceeding from one of the two alternating-current coefficients closest to the corner of the array where horizontal and vertical spatial frequencies are both zero, each diagonal of the coefficient array being consecutively numbered beginning with first in accordance with increase in distance of each said diagonal from the corner of the coefficient array where horizontal and vertical spatial frequencies are both zero; and using the alternating-current coefficients in a group arrayed along a number of consecutively numbered diagonals of each said discrete cosine transform block including at least the first diagonal thereof, for selecting which of preset reference classes said discrete cosine transform block is classified, according to the least value of the mean square of the values by which the alternating-current coefficients depart from corresponding ones of representative values for said preset reference class.

16. An image compression encoding method as claimed in claim 14, wherein in each of first-level, second-level and third-level said vector quantization steps, the approximation vectors are separated by equal sampling intervals.

17. An image compression encoding method as claimed in claim 16, wherein in each said first-level vector quantization step, three approximation vectors provide equal interval samplings, and in each said further-level vector quantization step, nine approximation vectors provide equal interval samplings.

18. An image compression encoding method as claimed in claim 14, wherein said step of formulating an dependently decodable code includes:

a substep of estimating from the number of bits resulting from encoding the video signal descriptive of a preceding image the number of bits expected to result, over an ensuing period of time ending at the same time as the next ending of one of consecutive prescribed time intervals, each of which prescribed time intervals is to contain a prescribed number of bits, providing that said dependently decodable code continued to be formulated in the same way from the respective further level codes of said discrete cosine transform blocks as they are scanned in prescribed order, and a substep of adjusting the prescribed permissible amount of error for each said further-level vector quantization step, raising the prescribed permissible amount when the estimated number of bits is above said prescribed number of bits, and lowering the prescribed permissible amount when the estimated number of bits is below said prescribed number of bits.

19. An image compression encoding method as claims in claim 14, wherein said step of formulating a dependently decodable code includes:

a substep of determining the quantity by which the result of encoding the video signal of a television image frame, which frame immediately preceded a television image frame currently being encoded, departed from the number of bits desired to keep frame coding rate uniform, and a substep of using that quantity as an error signal in a degenerative feedback subroutine that adjusts the coding in at least selected ones of said further-level vector quantization steps to control the number of bits contributed thereby for inclusion in dependently decodable codes for each said discrete cosine transform block, said degenerative feedback subroutine being of a type that said adjusts the prescribed permissible amount of error in at least selected ones of said further level vector quantization steps, as required to keep said frame coding rate uniform.

20. An image compression encoding method as claimed in claim 14, wherein said at least one further vector quantization step comprises an $n^{th}$-level vector quantization step and at times further comprises an $(n+1)^{th}$-level vector quantization step immediately thereafter, n being a positive whole number larger than one; wherein said at least one further vector quantization step never includes an $(n+2)^{th}$-level vector quantization step, or further vector quantization step beyond said $(n+1)^{th}$-level vector quantization step; and wherein said step of formulating a dependently decodable code includes:

a substep of determining the quantity by which the result of encoding the video signal of a television image frame, which frame immediately preceded a television image frame currently being encoded, departed from the number of bits desired to keep frame coding rate uniform, and a substep of using said quantity as an error signal in a degenerative feedback subroutine that adjusts the coding in at least selected ones of said further-level vector quantization steps to control the number of bits contributed thereby for inclusion in dependently decodable codes for each said discrete cosine transform block, said degenerative feedback subroutine reducing the number of bits generated by said $n^{th}$-level and $(n+1)^{th}$-level vector quantization steps, as required to keep frame coding rate uniform, by a progression in which the further-level codes for said discrete cosine transform blocks generated by the $(n+1)^{th}$-level vector quantization steps are omitted from said dependently decodable codes, beginning at the outer edges of the television image frame and working towards the center of the television image frame as further reduction in the number of bits generated by said $n^{th}$-level and $(n+1)^{th}$-level vector quantization steps is required, and in which, if still further reduction in the number of bits generated by said $n^{th}$-level and $(n+1^{th})$-level vector quantization steps is required, the further-level codes for said discrete cosine transform blocks generated by said $n^{th}$-level vector quantization steps are omitted from said dependently decodable codes, beginning at the outer edges of the television image frame and working towards the center of the television image frame as further reduction in the number of bits generated by said $n^{th}$-level and last-level $(n+1)^{th}$-level vector quantization steps is required.

* * * * *